UNITED STATES PATENT OFFICE.

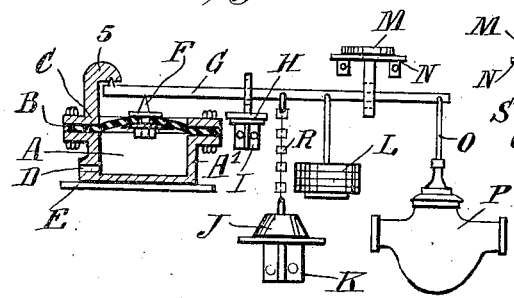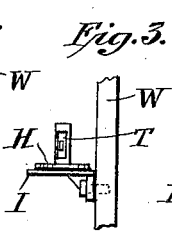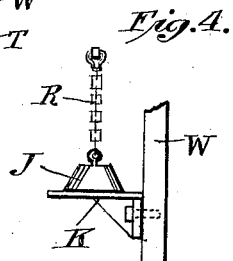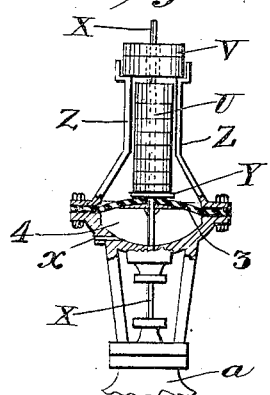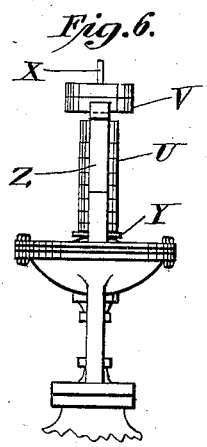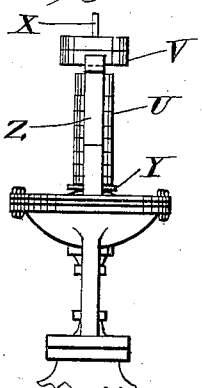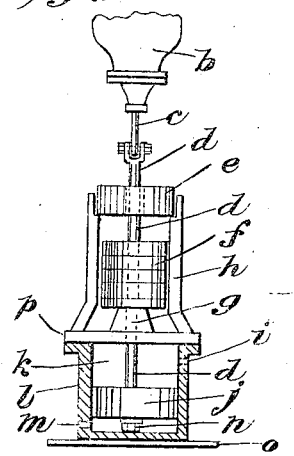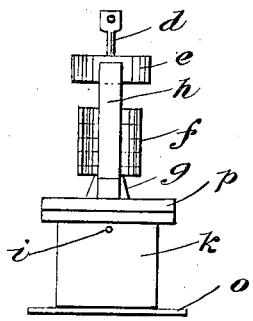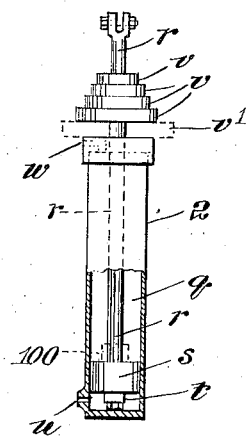

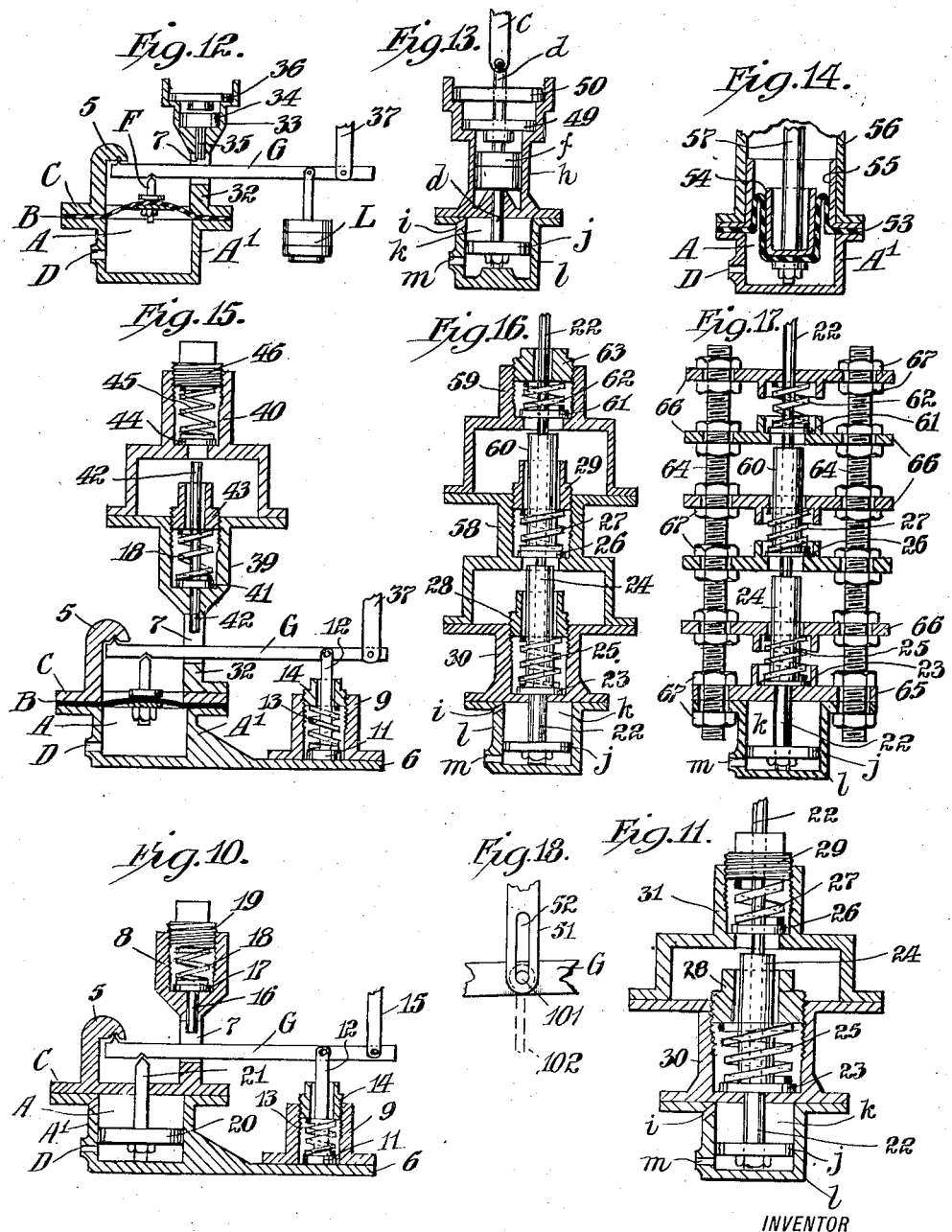

OWEN MARSHALL JONES, OF NEW YORK, N. Y.

FLUID-PRESSURE-OPERATED CONTROLLER.

1,335,898.  Specification of Letters Patent.  Patented Apr. 6, 1920.

Application filed March 26, 1917. Serial No. 157,450.

*To all whom it may concern:*

Be it known that I, OWEN MARSHALL JONES, a citizen of the United States, and a resident of the borough of Manhattan, city, county, and State of New York, have invented certain new and useful Improvements in Fluid-Pressure-Operated Controllers, of which the following is a specification accompanied by drawings.

The invention relates to improved controllers to be connected to and for controlling and operating reciprocating parts of mechanical devices, such as raising and lowering pistons and stems or levers of valves used for regulating the supply or feed of liquid to containers, although the invention may be used in any connection in which it is found applicable.

The objects of the invention are to improve upon and increase the efficiency of controllers to be attached to and for controlling the movement of reciprocating parts of mechanical devices employed to regulate the supply of liquids to a container when the pressure operating the controller is supplied from a separate pipe connecting the container with the controller.

Other objects of the invention are to produce controllers of simple design, and of the greatest durability.

Further objects of the invention are to arrange a combination of parts to form a controller, which, when the pressure operating it is supplied by the head of liquid in a feed or supply pipe to a tank or container, will compensate for the false or friction head pressure in the pipe when the liquid is in motion while flowing to or being forced to the container.

Further objects of the invention are to provide controllers with features of construction embodying a plurality of pressure resisting means. The said means may be equivalents of the weights and the springs which are preferably shown in the accompanying drawings. The equivalents may be pistons in pressure chambers, diaphragms actuated by pressure, or other selected devices. The method of supporting the pressure resisting means may be of many other methods than those shown in the drawings.

The controllers may have features of construction, combinations of elements, and arrangement of parts, substantially as hereinafter fully described and claimed in this specification, and shown in the accompanying drawings, in which—

Figure 1 is a side elevation partly in section, showing one construction of the controller which would be used to control a device employed to regulate the supply of liquid to a container where it is not necessary to compensate for false or friction head pressure in the pipe supplying pressure to actuate the controller.

Fig. 2 is a detail side view of part of Fig. 1.

Fig. 3 is a detail side view of another part of Fig. 1.

Fig. 4 is a detail side view of another part of Fig. 1.

Fig. 5 is a front elevation partly in section, showing another construction of the controller.

Fig. 6 is a side elevation of Fig. 5.

Fig. 7 is a front elevation partly in section of a modification of Fig. 5.

Fig. 8 is a side elevation of part of Fig. 7.

Fig. 9 is a side elevation partly in section of another modification.

Fig. 10 is a side elevation partly in section of another modification.

Fig. 11 is a side elevation partly in section of another modification.

Fig. 12 is a side elevation partly in section of another modification, which is to be used when it is necessary to compensate for false or friction head pressure in the pipe supplying pressure to actuate the controller.

Fig. 13 is a side elevation partly in section of another modification.

Fig. 14 is a sectional view of one form of pressure chamber and diaphragm.

Fig. 15 is a side elevation partly in section of another modification.

Fig. 16 is a side elevation partly in section of another modification.

Fig. 17 is a side elevation partly in section of another modification.

Fig. 18 is a view of the slotted end of a part to be controlled.

The pressures that operate the controllers are obtained by the head of liquids in the supply or feed pipes to containers in which the level or the levels of liquid are to be regulated by devices controlled by the controller.

The controller may be employed to control a device or a part of a device and a plurality of devices or a plurality of parts.

Referring to the drawings, in Fig. 1, I have shown parts and attachments which form the controller, and means by which it is operated. I do not limit myself to the form of or construction of the apparatus or the parts thereof as shown, as many other forms of construction are applicable. A' is a chamber body. A is a chamber. B is a diaphragm. C is a ring with a lug 5. D is a hole through the body of the chamber A for admitting fluid pressure into the chamber. E is a rest, stand, or bracket to hold the body of the chamber A. F is a pin attached to the diaphragm B which raises the lever or beam G by fluid pressure exerted on the under side of the diaphragm. G is a lever for operating the stem O of the valve in the body P. H is a weight which rests on the bracket I. J is a weight which rests on the bracket K. L is a weight of sufficient avoirdupois to resist a predetermined minimum upward pressure on the lever G. M is a weight which rests on the bracket N.

The weights H, J and M are each or collectively of sufficient avoirdupois equal to the difference between the predetermined minimum and maximum pressure entering the pressure chamber, as one or two or all of these weights may be embodied in a controller, or they can be as alternates each for the other. O is the stem of the valve in the body P. R is a chain attached to the lever G and the weight J. The stem O may be attached to any body which it is desired to control, regulate or move. The operation of this form of controller is as follows: The weight L holds down the lever G when the minimum pressure is in the chamber A. An increase of pressure in the chamber A forces up the diaphragm B and the pin F, and raises the lever G. The lever G in turn raises the stem O. When the lever G engages the weight H by travel to the top of the slot in the rod of the weight H, the travel upward of the lever G is momentarily stopped until the pressure in the chamber A rises sufficiently to lift the weight H from the bracket or rest I. Then the lever G has traveled to its maximum height and has pulled up the stem O to the limit desired. The weight of H can be decreased or increased in accordance with the variation of pressure desired. The same operation would take place in combination with the weight M for the same purposes as in case of weight H. The chain R attached to the lever G and the weight J would be slack when the lever G is lowered to its lowest point. When the lever G rises, it pulls the chain R taut and raises the weight J for the same purpose as in the weights H and M. One of the auxiliary weights H, M, and J can be used with the apparatus, or two or more of them can be used. I am not to be understood as limiting myself to any particular form of the chamber, diaphragm, lever, weights, or other parts of the combination forming the controller, as many other forms may be used in accordance with my invention.

In Fig. 5, I have shown a modification of the body of the pressure chamber, the diaphragm, and one of many methods of holding the weights in place. U is a weight rigidly mounted on the stem X and is for holding down the stem X when minimum pressure obtains in the chamber 4 under the diaphragm 3. V is an auxiliary weight. The stem X is suitably attached to the diaphragm and passes through the auxiliary weight V and will operate a stem which may be attached to the top of it, or will operate a valve in the body $a$, the top section of which is shown broken away. Y is a plate on top of the diaphragm 3 and acts as a base for the weight U. Z and Z are guides for the weight U and the top of them act as a rest for the weight V. $x$ is a port for pressure to enter the chamber 4. The operation is as follows: The weight U holds down the diaphragm 3 when minimum pressure obtains in the chamber. When the pressure increases in the chamber 4, the weight U rises until it engages the auxiliary weight V which momentarily stops the travel of the stem X until the pressure in the chamber 4 is increased to the maximum required, then the weight V is lifted a short distance and the stem X has traveled to the maximum height required. The avoirdupois of the weight U can be decreased or increased in accordance with the predetermined minimum pressure entering the pressure chamber 4. The avoirdupois of the weight V can be decreased or increased in accordance with the difference between the predetermined minimum and maximum pressures.

I am not to be understood as limiting myself to the particular forms of the parts of the combination comprising this form of controller, as other forms may be used in accordance with my invention.

In Fig. 7, I have shown a modification of the combination of parts of which the controller consists. $b$ is a portion of a valve body broken away, or may be a portion of any other device or apparatus. $c$ is a stem connecting the part to be moved to the rod $d$. The rod $d$ passes through the weights $e$ and $f$ and extends into the pressure chamber $k$, and is attached to the piston $j$ and is actuated with the piston. The weight $f$ is permanently attached to the rod $d$. $g$ is a rest for the weight $f$. $i$ is an air vent from the chamber $k$. $l$ is the body of the pressure chamber $k$. $m$ is an inlet for pressure to the under side of the piston $j$. $n$ is a nut for holding the piston $j$ on the rod $d$. $c$ is a rest or bracket for supporting the apparatus. The operation is as follows: The weight $f$ holds down the piston $j$ when the minimum pressure under the piston $j$ obtains. When the pressure increases the piston $j$ rises, lifting weight $f$ and continues to rise until the weight $e$ is engaged, then the travel of the piston $j$ momentarily stops until the pressure under it increases sufficiently to raise the weight $e$, which may be of any desired avoirdupois according to the difference between the minimum and the maximum pressure. The rod $d$ is raised by the piston $j$ and moves the stem $c$ up. When the pressure under the piston $j$ falls, the piston lowers and the stem $c$ is pulled down.

In Fig. 9, I have shown a modification. This form of controller is operated by pressure obtained by the head of water or other liquids in a container, which is located some distance above the controller, in which the level is to be controlled through the medium of a device controlled by the controller, and the head pressure to operate the controller is connected to the controller by an individual pipe from the container so that there is no false or friction head pressure in the pressure chamber of the controller, as would be the case should the pressure chamber be connected to the delivery pipe to the container. 2 is a hollow body or cylinder providing a piston chamber and is of a length to permit a piston, which works in it, to travel a distance proportional to the difference between the predetermined minimum and maximum heads. $q$ is a piston chamber. $s$ is a piston. $v$ are pressure resisting weights of avoirdupois proportional to the predetermined minimum head pressure and are for holding down the piston $s$ when the minimum head pressure obtains under the piston. $v'$ shown in dotted lines is an auxiliary pressure resisting weight which is used when the piston is to be moved in stages and is of avoirdupois proportional to a portion of the difference between the minimum and maximum head pressures. $r$ is a rod to which the bottom one of the weights $v$ is rigidly attached, and the rod extends through the auxiliary weight $v'$, when that weight is used, and through the top of the cylinder and into the piston chamber and connects to the piston. 100 shown in dotted lines is an enlargement on the rod $r$, and can be of any desired length, or a piece of metal tube can be placed over the rod $r$ to answer the same purpose as the enlargement, this enlargement is only necessary when the weight $v'$ is used. $t$ is a nut for holding the piston $s$ on the rod $r$. $u$ is an inlet into the piston chamber to admit pressure under the piston. $w$ is an air vent in the side of the cylinder. The operation of this form of controller, without the auxiliary weight $v'$ and the enlargement 100 on the rod $r$, is as follows: The weights $v$ hold down the piston $s$ when minimum pressure obtains under the piston. When the pressure increases the piston is forced upwardly and travels a distance equal to the increase of the head pressure. At that point the part or parts to be controlled which are attached to the top of the rod are moved to the predetermined position. When the head pressure decreases the piston is forced downwardly by the resisting pressure of the weights $v$, which gives the reverse motion for the operation of the movable part or parts to be controlled. When the controller is to control a part to be moved in predetermined stages, then the auxiliary weight $v'$ together with the enlargement 100 on the rod $r$ is used, the enlargement is made of a length suitable to engage the weight $v'$ at a predetermined point in the travel of the piston $s$. In this case the operation will be the same as is described above except that the piston $s$ travels a shorter distance and momentarily stops when the auxiliary weight $v'$ is engaged and remains at rest until the pressure under the piston increases sufficiently to raise the weight $v'$, then the piston and the rod $r$ travel upwardly to a predetermined point.

In Fig. 10, I have shown a modification of Fig. 1 when only the weights L and H are used, in so far that the piston 20 is used in place of the diaphragm B, and the spring 13 is used in place of weight L, and the spring 18 is used in place of the weight H. In all other respects and in operation this form of controller is essentially the same as in Fig. 1. The description and operation of the springs are as follows: The rod 12 attached to the beam G is also attached to the plate 11. The spring 13 is placed over the rod 12 and is held between the plate 11 and the compression plug 14, and is of sufficient resistance to equal the minimum pressure in the pressure chamber, the plug 14 may be screwed in or out to increase or decrease the tension of the spring 13 according to the minimum pressure. When the beam pulls up the rod 12 the spring 13 acts as a resisting means. The spring 18 is held between the plate 17 and the compression plug 19 and is of sufficient resistance force to equal the difference between the maximum and minimum pressures entering the pressure chamber, the plug 19 may be screwed in or out to increase or decrease the tension of the spring 18 according to the amount of pressure resistance desired.

In Fig. 11, I have shown a modification of Fig. 7 in so far that the springs 25 and 27 are used in place of the weights $f$ and $e$ respectively. In all other respects and in the operation this form of controller is essentially the same as in Fig. 7. The description and operation of the springs are as follows: The rod 22 is attached to the piston *j* and has an enlargement between the piston and the plate 23, the plate 23 is slipped loosely over the rod and rests on top of the edge of the enlargement, the tube 24 is placed over the rod at the point shown and acts as an enlargement to engage the plate 26 which is slipped loosely over the rod. The spring 25, which is of sufficient resistance force to equal the minimum pressure in the pressure chamber, is placed over the tube 24 and is held between the plate 23 and the compression plug 28. The plug 28 may be screwed in or out to increase or decrease the tension of the spring 25 according to the minimum pressure. When the rod 22 pushes up the plate 23 the spring 25 acts as a resisting means. The spring 27 is held between the plate 26 and the compression plug 29 and is of sufficient resistance force to equal the difference between the maximum and minimum pressures entering the pressure chamber *k*. The plug 29 may be screwed in or out to increase or decrease the tension of the spring 27 according to the amount of pressure resistance required.

In Figs. 1, 5, 7. 9, 10 and 11 I have shown the controller with a beam or a rod attached to the part, or to a part of the device, to be controlled, which gives a positive and gradual travel to the part to be moved. This would apply to the control of devices which regulate the supply or feed of fluids or which regulate apparatus which supplies or feeds fluids to a container. This also applies to the control of a valve or other means through which power is delivered to apparatus which supplies or feeds fluid to a container, where it is desired to maintain a mean level in a container when the head of liquid is connected with the pressure chamber of the controller by an individual pipe running from the container.

In Figs. 12, 13, 15, 16 and 17 described below, I show the controller with two auxiliary pressure resisting means, which are employed when the head of liquid in the supply or feed pipe to the container is connected with the pressure chamber, and a false or friction head pressure is to be compensated for. In this case it is necessary to have a slot in the end of the controlled part which is connected to the controller, as shown in Fig. 18. The slot to be of a predetermined length which would be less than the length of the total travel of the part controlled. A pin 101 shown in Fig. 18 would be placed through the end of the beam or the rod of the controller and into the slot. When the beam or the rod of the controller is down to the lowest point, the predetermined minimum level is reached and the pin has engaged the bottom of the slot and has pulled down the controlled part and the means which forces the liquid to the container is started in motion.

When the beam or the rod moves upwardly the pin engages the top of the slot and pushes up the part to the predetermined point of its travel and the maximum level in the container has been reached, and the means which regulates the supply of liquid to the container is closed off, and the false or friction head is discontinued, then the rod or the beam will be partly forced down by the auxiliary pressure resisting means, thus disengaging the pin and the pin 101 will remain at a point between the bottom and the top of the slot, and the pin will not engage the bottom of the slot and pull down the controlled part until the minimum level is reached again. When that occurs the feeding means is started in motion again.

In Fig. 12, I have shown a modification of Fig. 1 in so far as the design of that portion of the controller for supporting auxiliary pressure resisting means, when at rest, is concerned, but I do not limit myself to this method of supporting the auxiliary pressure resisting means, as many methods may be employed. A plurality of the above said means is necessary in this form of controller. The parts A', A, B, C, 5, D, F, G, and L are the same, are for the same purpose, and perform the same functions as in Fig. 1. 32 is a post for supporting the rest 33. 33 is a rest for the plurality of auxiliary pressure resisting means. 7 is a slot through the post 32 which acts as a guide for the beam G. 37 is the end of the part to be moved and controlled and is attached to the pressure actuated means G. 34 and 36 are auxiliary pressure resisting means shown here in the form of avoirdupois members or weights. The weight 34 is of avoirdupois proportional to a pressure slightly less than the difference between the predetermined minimum and maximum main head pressures. The weight 36 is proportional to the false or friction head created when the liquid is in motion through the supply or feed pipe to the container. 35 is a stem or pin attached to weight 34 which is engaged by the beam G for raising the weight 34. The operation of this form of controller is as follows: When the pressure in the pressure chamber begins to increase above the predetermined minimum pressure the beam G travels upwardly until it engages the end of the pin 35 through which the weight 34 is engaged. The travel of the beam is stopped until the pressure increases sufficiently to raise the auxiliary weight 34. When the weight 34 is raised the beam continues to travel as the pressure increases until the weight 34 engages the auxiliary weight 36. Then the travel of the beam is stopped again and remains at rest until the pressure increases sufficiently to raise the weight 36. When the weight 36 has been raised the beam continues to travel as the pressure increases until the beam engages the top of the slot 7 which brings the beam at rest as it has reached the predetermined total travel required for it and the part to be controlled which is attached to it. The pressure drops when the false or friction head is discontinued and the beam moves downwardly a distance in ratio to the drop of the friction head pressure, and as the main head pressure decreases the beam will move downwardly to the farthest downward point of its travel. Thereby the stem or rod (37) engaging the part to be controlled is actuated as is the beam, and is designed to perform its function as may be predetermined.

In Fig. 13, I have shown a modification of Fig. 12 in so far as substituting the piston $j$ for diaphragm B, the rod $d$ for the lever G, the rod $c$ for the rod 37, the weight $f$ for the weight L, the weight 49 for the weight 34, and the weight 50 for the weight 36. The weights 49 and 50 are auxiliary weights fitted loosely on the rod $d$. When the rod is actuated and the weight 49 is engaged, then the upward travel of the rod is stopped until the pressure increases in the pressure chamber sufficiently to raise the weight 49. When the weight 49 is raised the rod continues to travel as the pressure increases until the weight 49 engages the weight 50. Then the travel of the rod is stopped again and remains at rest until the pressure increases sufficiently to raise the weight 50. When the weight 50 has been raised the rod continues to travel as the pressure increases until the rod reaches the predetermined total travel required for it and the part to be controlled which is attached to it. The pressure drops when the false head is discontinued and the rod moves downwardly a distance in ratio to the drop of the false head pressure, and as the main head pressure decreases the rod will move downwardly to the farthest downward point of its travel. Thereby the stem ($c$) of the part to be controlled is actuated as is the rod ($d$), and is designed to perform its function as may be predetermined.

In Fig. 14, I have shown the diaphragm 53, which is a modification of the diaphragm B shown in Fig. 12. This is an inverted diaphragm and is telescopic in action, and will withstand a greater pressure than the dish or saucer shaped diaphragm.

In Fig. 15, I have shown a modification of Fig. 12 in so far as substituting the springs 13, 18 and 45 for the weights L, 34 and 36 respectively, and embodying means for retaining these springs in proper position. The springs 13, 18 and 45 are for the same purpose as are the weights L, 34 and 36 respectively in Fig. 12. The beam G engages and raises the spring 18 by the pressure it exerts against the rod 42, at a predetermined point in the increase of pressure in the pressure chamber, as the plate 41 is rigidly attached to the rod 42 and pushes the spring 18. The spring 45 is engaged and raised by pressure exerted by the rod 42 against the plate 44.

In Fig. 16, I have shown a modification of Fig. 11 in so far as embodying the second auxiliary spring 62 and a cage or yoke for retaining it in position, and embodying the tube 60 inside the inner circle of the spring 27 for engaging the plate 61 for pushing up on the spring 62. In this form of controller, the spring 25 is the means for resisting the minimum pressure. The spring 27 is the means for resisting the pressure at one stage in the increase of the pressure, and the spring 62 is the means for resisting the false head pressure. In other respects the operation of the controller is similar to the controller shown in Figs. 13 and 15.

In Fig. 17, I have shown a modification of Fig. 16 in so far as the methods of retaining the springs in position and for increasing and decreasing the tension of the springs are concerned. The springs are within the sockets formed on the bridge plates 65 and 66. The bridge plates are mounted on the threaded bars 64 and 64 and held in place by the nuts 67. The increase and the decrease of the tension of the springs is obtained by forcing the pair of bridge plates which hold each spring, closer together or farther apart by screwing up or backing off the corresponding nuts on the threaded bars. This adjustment of the bridge plates performs the same function as that obtained by the compression plugs 28, 29, and 63 in Fig. 16. The operation is the same as in Fig. 16.

In Fig. 18, I have shown the method by which the beam or the rod of the controller engages the part, or a part of the device, to be controlled, where the controlled part is not to have a steady motion, but is to be moved only at the finish of the alternating stroke or travel of the pressure actuated means of the controller. 51 is the broken off end of the part to be controlled. 52 is a slot in the said end, and is made of a length suitable for the predetermined distance of travel required of the controlled part. G is the end portion of a beam which is a part of the controller. 102, shown in dotted lines, is the end portion of a rod which is a part of the controller. 101 is a pin which is rigidly mounted in the beam or the rod and enters into the slot 52. As shown in this figure, the beam or the rod are at the extreme point of their downward travel and the pin has engaged the bottom of the slot thus pulling the controlled part down. When the beam or the rod travels upwardly the pin engages the top of the slot and pushes the controlled part up. Between the extreme points of the travel of a beam or the rod the controlled part is at rest as the pin floats between the bottom and top of the slot.

It is to be understood where I have shown a piston and where the word "piston" is used that I do not limit myself to a piston as it may be desirable to use a flexible diaphragm or other structure performing functions similar to the functions performed by a piston, as in accordance with common understanding a flexible diaphragm is the equivalent of a piston.

When the fluid pressure increases and flows into the chamber through the port or passage through the wall of the chamber and forces the piston or diaphragm upwardly the volume of fluid within the chamber increases, and when the fluid pressure decreases and the piston or diaphragm is forced downwardly by the pressure resisting means a substantial amount of the fluid is forced out of the chamber through the passage through the wall of the chamber through which the fluid entered. Therefore, it is obvious that the port or opening performing the function of a passage through the wall of the chamber is a combined inlet to and outlet from the pressure chamber.

Obviously, some features of my invention may be used without others, and may be used in a variety of combinations and my invention may be embodied in widely varying forms.

Therefore, without limiting myself to the forms or constructions, or parts or arrangements of parts shown and described, nor enumerating equivalents, I claim, and desire to secure by Letters Patent, the following:

1. In a fluid pressure operated controller, the combination of a pressure chamber provided with a combined inlet and outlet passage through its wall, a piston operatable within the said pressure chamber, means actuated by the said piston and adapted to be connected to and to actuate a part or parts of a device to be controlled, means connected to the said piston actuated means to exert resisting pressure against the piston actuated means proportional to the minimum working pressure in the said pressure chamber, and means to exert resisting pressure against the said piston actuated means proportional to the pressure difference of the minimum and maximum working pressures alternately obtained in the said pressure chamber when automatically engaged by the said piston actuated means and held in place by suitable means when not engaged by the said piston actuated means.

2. In a fluid pressure operated controller, the combination of a pressure chamber provided with a combined inlet and outlet passage through its wall, a piston operatable within the said pressure chamber, means actuated by the said piston and adapted to be connected to and to actuate a part or parts of a device to be controlled, means connected to the said piston actuated means to exert variable resisting pressure against the piston actuated means proportional to variable minimum working pressure in the said pressure chamber, and means to exert variable resisting pressure against the said piston actuated means proportional to the pressure difference of the variable minimum and maximum working pressure alternately obtained in the said pressure chamber when automatically engaged by the said piston actuated means and held in place by suitable means when not engaged by the said piston actuated means.

3. In a fluid pressure operated controller, the combination of a pressure chamber provided with a combined inlet and outlet passage through its wall, a piston operatable within the said pressure chamber, means actuated by the said piston and adapted to be connected to and to actuate a part or parts of a device to be controlled, means connected to the said piston actuated means to exert resisting pressure against the piston actuated means proportional to the minimum working pressure in the said pressure chamber and provided with means of adjustment for varying the pressure resistance when desired, and means to exert resisting pressure against the said piston actuated means proportional to the pressure difference of the minimum and maximum working pressures alternately obtained in the said pressure chamber when automatically engaged by the said piston actuated means and held in place by suitable means when not engaged by the said piston actuated means and provided with means of adjustment for varying the pressure resistance when desired.

4. In a fluid pressure operated controller, the combination of a pressure chamber provided with a combined inlet and outlet passage through its wall, a piston operatable within the said pressure chamber, means actuated by the said piston and adapted to be connected to and to actuate a part or parts of a device to be controlled, means connected to the said piston actuated means to exert resisting pressure against the piston actuated means proportional to the minimum working pressure in the said pressure chamber, and a plurality of means to exert resisting pressure against the said piston actuated means proportional to the pressure difference of the minimum and maximum working pressures alternately obtained in the said pressure chamber when automatically engaged by the said piston actuated means and held in place by suitable means when not engaged by the said piston actuated means.

5. In a fluid pressure operated controller, the combination of a pressure chamber provided with a combined inlet and outlet passage through its wall, a piston operatable within the said pressure chamber, means actuated by the said piston and adapted to be connected to and to actuate a part or parts of a device to be controlled, means connected to the said piston actuated means to exert resisting pressure against the piston actuated means proportional to the minimum working pressure in the said pressure chamber and provided with means of adjustment for varying the pressure resistance when desired, and a plurality of means to exert resisting pressure against the said piston actuated means proportional to the pressure difference of the minimum and maximum working pressures alternately obtained in the said pressure chamber when automatically engaged by the said piston actuated means and held in place by suitable means when not engaged by the said piston actuated means and provided with means of adjustment for varying the pressure resistance when desired.

6. In a fluid pressure operated controller, the combination of a pressure chamber provided with a combined inlet and outlet passage through its wall, a piston operatable within the said pressure chamber, means actuated by the said piston and adapted to be connected to and to actuate a part or parts of a device to be controlled, means connected to the said piston actuated means to exert resisting pressure against the piston actuated means proportional to the minimum working pressure in the said pressure chamber and provided with means of adjustment for varying the pressure resistance when desired, means to exert resisting pressure against the said piston actuated means when automatically engaged by the said piston actuated means and held in place by suitable means when not engaged by the said piston actuated means and provided with means of adjustment for varying the pressure resistance when desired—the pressure exerted being proportional to the pressure difference of the minimum and maximum working pressures alternately obtained in the said pressure chamber when the fluid supplying pressure to the said chamber is not in motion, and means to exert resisting pressure against the said piston actuated means proportional to the friction pressure of the fluid in motion when automatically engaged by the said piston actuated means and held in place by suitable means when not engaged by the said piston actuated means and provided with means of adjustment for varying the pressure resistance.

In testimony whereof I have signed this specification in the presence of the subscribing witness.

OWEN MARSHALL JONES.

Witness:
LAURA E. SMITH.